(12) United States Patent
Thomas et al.

(10) Patent No.: US 11,698,225 B2
(45) Date of Patent: Jul. 11, 2023

(54) MODELLING OF A DISTILLATION COLUMN WITH OPERATING STATE CHANGES

(71) Applicant: LINDE AKTIENGESELLSCHAFT, Munich (DE)

(72) Inventors: Ingo Thomas, Oberhaching (DE); Bernd Wunderlich, Starnberg (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 1303 days.

(21) Appl. No.: 16/163,195

(22) Filed: Oct. 17, 2018

(65) Prior Publication Data
US 2019/0113278 A1    Apr. 18, 2019

(30) Foreign Application Priority Data
Oct. 18, 2017   (EP) .................................... 17020477

(51) Int. Cl.
*F25J 3/04*      (2006.01)
*G06F 30/20*     (2020.01)
*G06F 111/10*    (2020.01)

(52) U.S. Cl.
CPC ......... *F25J 3/04848* (2013.01); *F25J 3/0409* (2013.01); *F25J 3/04296* (2013.01);
(Continued)

(58) Field of Classification Search
CPC ........ F25J 3/04; F25J 3/04406; F25J 3/04412; F25J 3/04418; F25J 3/0443;
(Continued)

(56) References Cited

U.S. PATENT DOCUMENTS

| | | | | |
|---|---|---|---|---|
| 5,522,224 A | * | 6/1996 | Canney ..................... | F25J 3/048 700/271 |
| 2013/0053998 A1 | * | 2/2013 | Singhal ................ | F25J 3/04303 700/108 |

(Continued)

OTHER PUBLICATIONS

European Search Report for EP17020477 dated Feb. 27, 2018.
(Continued)

*Primary Examiner* — John F Pettitt, III
(74) *Attorney, Agent, or Firm* — Millen, White, Zelano & Branigan, P.C.; William Nixon (57) ABSTRACT

A method is provided for determining a state of a distillation column having multiple column stages for separating a feed fluid stream into individual fluid components. The state is determined by means of a model in a manner dependent on pressure differences prevailing between adjacent column stages. In the model, both gaseous and liquid flows between adjacent column stages are brought about by the pressure differences prevailing between adjacent column stages. A substance quantity flow characterizing gaseous flow between two column stages is given by $\dot{N}_V \cdot R_V = C_V \cdot \Delta p_V$. A substance quantity flow characterizing liquid flow between two column stages is given by $\dot{N}_L \cdot R_L = C_L \cdot \Delta p_L$. $\Delta p_{V,L}$ is a total pressure difference between two adjacent column stages. $R_{V,L}$ is a coefficient of resistance between two adjacent column stages and $C_{V,L}$ is a conductance value of flow between two adjacent column stages.

11 Claims, 4 Drawing Sheets

(52) U.S. Cl.
CPC ....... *F25J 3/04412* (2013.01); *F25J 3/04678* (2013.01); *F25J 3/04727* (2013.01); *F25J 3/04793* (2013.01); *G06F 30/20* (2020.01); *F25J 2290/10* (2013.01); *G06F 2111/10* (2020.01)

(58) Field of Classification Search
CPC .. F25J 3/04436; F25J 3/04781; F25J 3/04812; F25J 3/0483; F25J 3/04836; F25J 3/04842; F25J 2290/10; F25J 2280/00; F25J 2280/02; F25J 2280/10; F25J 2280/20; F25J 2280/30; F25J 2280/40; F25J 2280/50; G06F 17/12; G06F 17/13; G01N 33/0004; G01N 33/225; B01D 3/00; B01D 3/06; B01D 3/14; B01D 3/16; B01D 3/18; B01D 3/26; B01D 3/42; B01D 3/4211

See application file for complete search history.

(56) References Cited

U.S. PATENT DOCUMENTS

2016/0202223 A1* 7/2016 Ammouri .............. G06Q 50/00
702/24
2018/0264376 A1* 9/2018 Yao ........................ G05B 15/02

OTHER PUBLICATIONS

Seliger, B. et al., "Modelling and dynamics of an air separation rectification column as part of IGCC power plant," Separation and Purification Technology, 2006, vol. 49, pp. 136-148.

Hanke, R. et al., "Dynamic Simulation of a low-temperature Rectification Column as Part of an IGCC Power Plant," Chem. Eng. Technol., 2003, vol. 26, No. 11, pp. 1126-1130.

Bian, S. et al., "Compartmental modeling of high purity air separation columns," Computers and Chemical Engineering, 2005, vol. 29, pp. 2096-2109.

Roffel, B. et al., "First principles dynamic modeling and multivariable control of a cryogenic distillation process," Computers and Chemical Engineering, 2000, vol. 24, pp. 111-123.

* cited by examiner

MODELLING OF A DISTILLATION COLUMN WITH OPERATING STATE CHANGES

The invention relates to a method for determining a state of a distillation column having multiple column stages for separating a feed fluid stream into individual fluid components.

BACKGROUND OF THE INVENTION

A typical example for the separation of a feed fluid stream into individual fluid components is air separation. The production of air products in a liquid or gaseous state by cryogenic separation of air in (cryogenic) air separation installations (or air separation units (ASUs)) is known and described for example in H.-W. Häring (ed.), Industrial Gases Processing, Wiley-VCH, 2006, in particular Section 2.2.5, "Cryogenic Rectification".

Air separation installations have distillation column systems which can for example take the form of two-column systems, in particular conventional Linde double-column systems, but also of three- or multi-column systems. Apart from the distillation columns for the production of nitrogen and/or oxygen in a liquid and/or gaseous state (for example liquid oxygen, LOX, gaseous oxygen, GOX, liquid nitrogen, LIN and/or gaseous nitrogen, GAN), that is to say the distillation columns for nitrogen-oxygen separation, it is also possible to provide distillation columns for the production of other air components, in particular the noble gases krypton, xenon and/or argon.

Air separation installations are normally operated statically (or at most with very low dynamics). Here, a feed air stream is drawn in, and compressed, by means of a main air compressor. The compressor power is normally kept constant at the operating point for which the installation is designed.

Seliger et al.: "Modelling and dynamics of an air separation rectification column as part of an IGCC power plant", Separation and Purification Technology 49 (2006), pages 136-148, Elsevier Science, Amsterdam, describes the modelling of a distillation column in a steady state.

DISCLOSURE OF THE INVENTION

Proceeding from said prior art, a method for determining a state of a distillation column having multiple column stages for separating a feed fluid stream into individual fluid components, is proposed which has the features of:
  determining a state of a distillation column having multiple column stages for separating a feed fluid stream into individual fluid components, wherein the state is determined by means of a model in a manner dependent on pressure differences prevailing between adjacent column stages,
    wherein, in the model, both the gaseous and the liquid flows between the adjacent column stages are brought about by the pressure differences prevailing between the adjacent column stages,
    wherein, in the model, a substance quantity flow $\dot{N}_V$ which characterizes the gaseous flow between two columns stages is given by $\dot{N}_V \cdot R_V = C_V \cdot \Delta p_V$, and a substance quantity flow $\dot{N}_L$ which characterizes the liquid flow between two column stages is given by $\dot{N}_L \cdot R_L = C_L \cdot \Delta p_L$,
    where, respectively for the gaseous or liquid phase, $\Delta p_{V,L}$ is a total pressure difference between the two adjacent column stages, $R_{V,L}$ is a coefficient of resistance between the two adjacent column stages and $C_{V,L}$ is a conductance value of the flow between the two adjacent column stages.

Advantageous embodiments are in each case the subject matter of the dependent claims and of the description which follows.

[zu Anspruch 1]

One aspect of the invention relates to such a method, which is based on an innovative model of a distillation column, wherein the state is determined in a manner dependent on pressures prevailing between adjacent column stages. A state determined in this way is characterized in particular by a temperature and/or fluid component concentrations for each column stage, which therefore preferably likewise are considered.

The invention allows a distillation column and thus in particular an air or generally fluid separation installation to be simulated in a dynamic state, that is to say in particular during the disappearance or appearance of a gaseous or liquid flow and, based on the results, to then, overall, be operated no longer just statically but dynamically, for example with a variable compressor power. In this way, it is in particular possible to respond in a targeted manner to varying demands and fluctuating energy prices (even for control energy, that is to say the energy which a network operator requires in order to compensate for unforeseen power fluctuations in its power supply system), as examples of cost variables.

For example, energy prices are in the meantime fluctuating with time in some cases to a very large extent, with the result that the static operation of fluid separation installations is no longer optimal from an economic viewpoint. However, there had hitherto been no known methods for being able to predict with sufficient accuracy the behaviour of the installation in the case of a varying, and in this case in particular a completely absent or newly fed, feed fluid stream. In particular, questions are raised concerning operability, maximum load-changing rate, effects on the lifetime of the installation, optimum control and influence on the product quality.

The distillation columns constitute a significant component for the dynamics of a fluid separation installation. These apparatuses are not only stores for mass and energy (which can be represented well by delay elements), but reveal a highly nonlinear interaction of temperature, concentration, pressure and load profiles with the storage volume (which is distributed over the column height). In order to represent this behaviour in terms of simulation, a series of challenges has to be faced:
  The initialization/starting-value calculation of a column is difficult enough in the simpler case of the steady column model.
  The equations for the phase equilibrium (isofugacity equations) have to be stabilized regarding the disappearance of a phase.
  It is likewise necessary to stabilize the equations for the hydrostatic procedures (1D momentum balances) regarding "dry running".
  In extreme operating situations, streams within the installation model have to become zero or even change the direction of flow.

For this purpose, the invention makes use of a new approach to the modelling of a distillation column having multiple column stages based on a rigorous dynamic thermohydraulic simulation of a distillation column, with time-variable parameters taken into consideration. Here, the individual column stages (normally so-called packings or trays) are modelled as equilibrium stages. An equation-based simulation approach is involved, in which the solution of the model equations is realized in a simultaneous manner by an adapted Newton method (see for example Hanke-Bourgeois, Martin: *Grundlagen der numerischen Mathematik and des wissenschaftlichen Rechnens*. [Fundamentals of numerical mathematics and scientific computing.] Studium. Vieweg+ Teubner, Wiesbaden, 3rd updated edition, 2009). In order to determine the change with respect to time of the operating conditions or of the state, it is preferable to apply a backward difference method with a predictor-corrector method, in which firstly an approximate solution of the system of equations is generated for the time step n+1 (cf. BDF (Backward Differentiation Formulas) method). The approximate solution can be determined via a polynomial whose coefficients are obtained from the current time step n and the previous time step n−1. The determination of estimated values of the time-variable process variables is thus realized for the time step n+1 by extrapolation of the polynomial function. In a second step, the exact correction to the solution is carried out via the aforementioned Newton method using these extrapolated start values. For the sake of completeness, it should be mentioned that other integration methods may also be used. Dynamic optimization of the column operation could also be carried out for example using a collocation method.

In contrast with conventional process engineering, however, it is the case here that, in the model, all the—both gaseous and liquid—fluid movements are brought about by a driving total pressure difference. In this approach, which is referred to as a pressure-driven approach, all the flow paths are characterized by coefficients of resistance R and conductance values C. Advantageously, the invention makes use of an innovative method of action, in which a quasilinear approach of the form $$C \cdot \Delta p = R \cdot \dot{N}$$

is pursued. With this relationship, the specific sizes of fluid contents in a balance element are scaled to the actual flow between different balance spaces. According to the model equation, it can be more advantageous in numerical terms to determine an R or C value or to extend the linear approach to a nonlinear relationship by implementing a substance flow-dependent value ($R/C=f(\dot{N})$), that is to say both R and C may be functions of the state. In particular, a pressure-flow system which is globally linear and is able to be used even for zero flows is thereby obtained. The flowing substance quantities N between two nodes (here column stages) in a pressure network are in this case established via the total pressure difference $\Delta p$ between said two nodes. The coefficient of resistance R can both be constant, in the simplest case, or be determined via the resulting process variables, in the nonlinear case. A zero flow can be simulated via the conductance value C even when a total pressure difference prevails, which can be necessary for a correct representation of the hydrodynamic processes in the system. This approach and a linearization of the pressure and flow relationship allows stable calculation of a zero flow and also of flow reversal. In order to represent these processes, a process stream no longer has to be given explicitly, that is to say as a list of the component streams and the enthalpy stream, but rather is present implicitly as a flow function which describes the flow through an imaginary diaphragm as a function of the states to the left and right thereof. The invention thus presents a model which can represent the complete operating range of a distillation column, with the result that both steady and dynamic states can be determined, in particular during a change from a fluid movement to a zero flow, during a change from a zero flow to a fluid movement, during a change from a single-phase gas flow to a two-phase rectification or during a change from a two-phase rectification to a single-phase gas flow.

A further aspect of the invention relates to a method for operating a distillation column, in particular as part of a fluid separation installation, in which, on the basis of the above model of the distillation column, for at least one manipulated variable, such as for example a feed fluid stream throughflow rate or compressor power, a manipulated variable value to be set is, in a manner dependent on at least one control variable, determined and set. The control variable may in particular be a product quality, a product volume stream or a product mass stream.

In principle, a so-called model predictive control (MPC) is involved. In the MPC, use is made of a time-discrete dynamic model of the process to be controlled in order to calculate, in a manner dependent on the input signals, the later behaviour of the process. This allows the calculation of input signals which are optimal in the context of a quality function, which lead to optimal output signals. Here, it is possible for input, output and state limitations to be considered simultaneously. As will be explained below, the control variable may in particular also be a cost variable.

A refinement of said aspect relates to a method for operating a distillation column, in particular as part of a fluid separation installation, in which a throughflow rate, in particular a volume throughflow rate, of the feed fluid stream is predefined, in a manner dependent on at least one cost variable, in particular by means of actuation of a compressor unit. As cost variable, in particular an energy demand, a product demand, a product quality, an availability of starting material, an installation load or lifetime, etc. are to be understood, that is to say variables for which the operation of the installation should be optimized (the value of the variable should for example not fall below or exceed a certain threshold and/or be as large as possible or as small as possible). In particular, multiple such boundary conditions should also be simultaneously adhered to such that there is multivariable control or optimization.

A computing unit according to the invention is set up, in particular in terms of programming, to carry out a method according to the invention.

The implementation of the method in the form of a computer program is also advantageous, since this entails particularly low costs, in particular if a control unit which is being implemented is also used for other tasks and is therefore present in any case. Suitable data carriers for making available the computer program are, in particular, magnetic, optical and electrical memories, such as for example hard disks, flash memories, EEPROMs, DVDs and the like. A download of a program via computer networks (internet, intranet etc.) is also possible.

Further advantages and configurations of the invention will emerge from the description and the appended drawing.

The invention is schematically illustrated in the drawing on the basis of exemplary embodiments and will be described below with reference to the drawing.

DETAILED DESCRIPTION OF THE DRAWINGS

Figure 1:
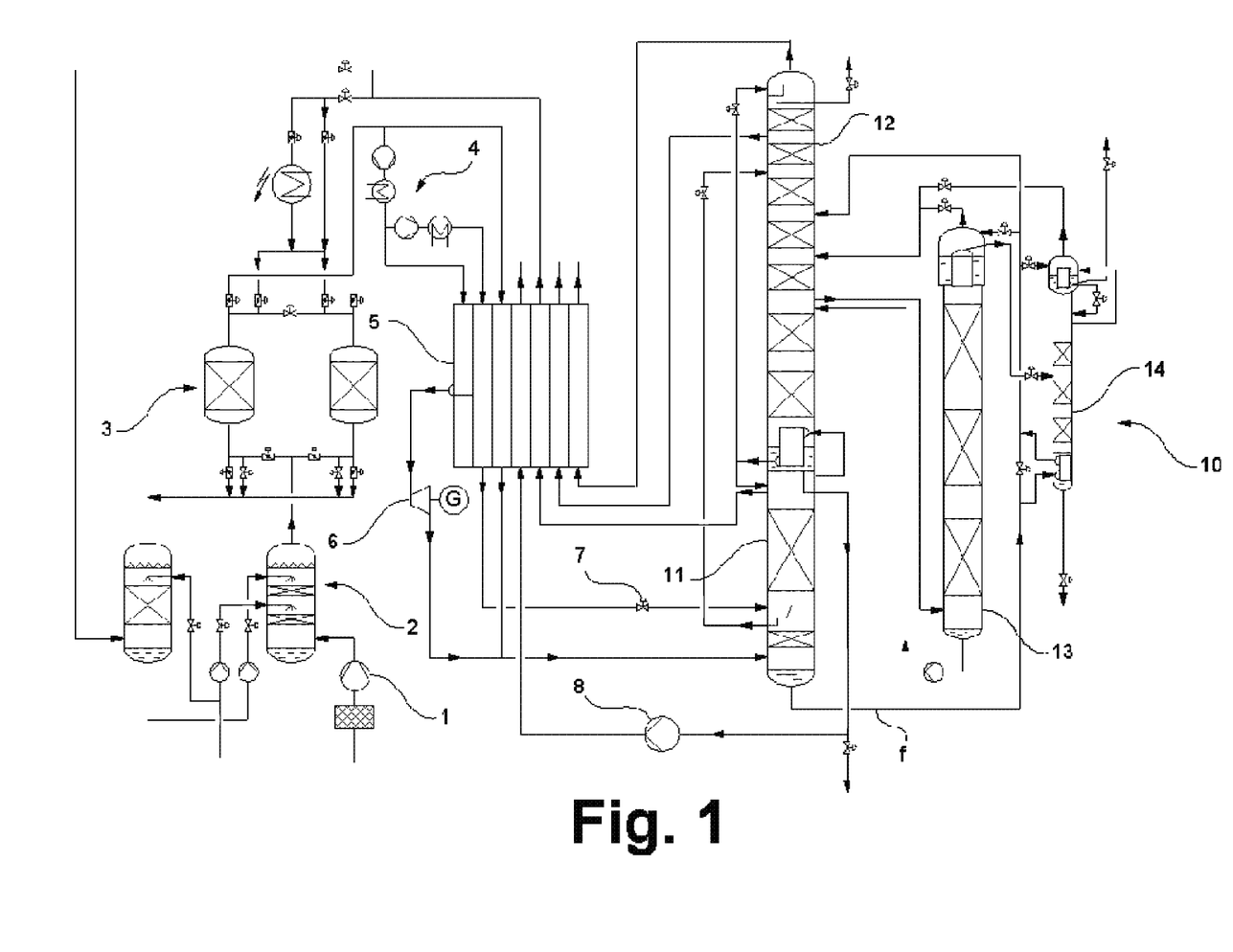
FIG. 1 schematically shows, in a block diagram, an air separation installation with distillation columns, such as can form the basis of the invention.

The separation on which the invention is based of fluid components, such as for example the production of oxygen, nitrogen and, if desired, further substances, such as for example argon, is realized in a fluid separation installation, such as for example a conventional air separation installation, as shown for example in FIG. 1. In this case, the starting substance air is cooled down and conducted into a rectification system having a column system, which provides a sufficiently large mass transfer area.

Air separation installations of the type shown are described to a large extent elsewhere, for example in H.-W. Häring (ed.), Industrial Gases Processing, Wiley-VCH, 2006, in particular Section 2.2.5, "Cryogenic Rectification". For detailed explanations regarding construction and functioning, reference is therefore made to corresponding technical literature. An air separation installation for implementing the present invention may be formed in a wide variety of ways.

The air separation installation shown by way of example in FIG. 1 has inter alia a main air compressor 1, a pre-cooling device 2, a purification system 3, a post-compressor arrangement 4, a main heat exchanger 5, an expansion turbine 6, a throttle device 7, a pump 8 and a distillation column system 10. In the example illustrated, the distillation column system 10 comprises a conventional double-column arrangement made up of a high-pressure column 11 and a low-pressure column 12, and a crude argon column 13 and a pure argon column 14.

In the air separation installation 100, a feed air stream is drawn in via a filter (not shown), and compressed, by means of the main air compressor 1. The compressed feed air stream is fed to the pre-cooling device 2 operated with cooling water. The pre-cooled feed air stream is purified in the purification system 3. In the purification system 3, which typically comprises a pair of alternately operated adsorber vessels, the pre-cooled feed air stream is substantially freed of water and carbon dioxide.

Downstream of the purification system 3, the feed air stream is divided into two partial streams. One of the partial streams is completely cooled down in the main heat exchanger 5 at the pressure level of the feed air stream. The other partial stream is post-compressed in the post-compressor arrangement 4 and likewise cooled down in the main heat exchanger 5, albeit only to an intermediate temperature level. Following the cooling to the intermediate temperature level, this so-called turbine stream is expanded by means of the expansion turbine 6 to the pressure level of the completely cooled partial stream, combined therewith, and fed into the high-pressure column 11.

An oxygen-enriched liquid bottom fraction and a nitrogen-enriched gaseous top fraction are formed in the high-pressure column 11. The oxygen-enriched liquid bottom fraction is drawn off from the high-pressure column 11, used in part as a heating medium in a bottom evaporator of the pure argon column 14 and, in each case in defined fractions, fed into a top condenser of the pure argon column 14, into a top condenser of the crude argon column 13 and into the low-pressure column 12. Fluid evaporating in the evaporating spaces of the top condensers of the crude argon column 13 and the pure argon column 14 is likewise transferred into the low-pressure column 12.

The gaseous nitrogen-rich top product is drawn off from the top of the high-pressure column 11, liquefied in a main condenser which establishes a heat-exchanging connection between the high-pressure column 11 and the low-pressure column 12, and, in fractions, is, as reflux, applied to the high-pressure column 11 and expanded into the low-pressure column 12.

An oxygen-rich liquid bottom fraction and a nitrogen-rich gaseous top fraction are formed in the low-pressure column 12. The former is partly pressurized in liquid form in the pump 8, heated in the main heat exchanger 5, and provided as product. A liquid nitrogen-rich stream is drawn off from a liquid-retaining device at the top of the low-pressure column 12 and discharged as liquid nitrogen product from the air separation installation 100. A gaseous nitrogen-rich stream drawn off from the top of the low-pressure column 12 is conducted through the main heat exchanger 5 and is provided as nitrogen product at the pressure of the low-pressure column 12. From the low-pressure column 12, a stream is furthermore drawn off from an upper region, and used as so-called impure nitrogen in the pre-cooling device 2 after being heated in the main heat exchanger 5 or used in the purification system 3 after being heated by means of an electric heater.

Figure 2:
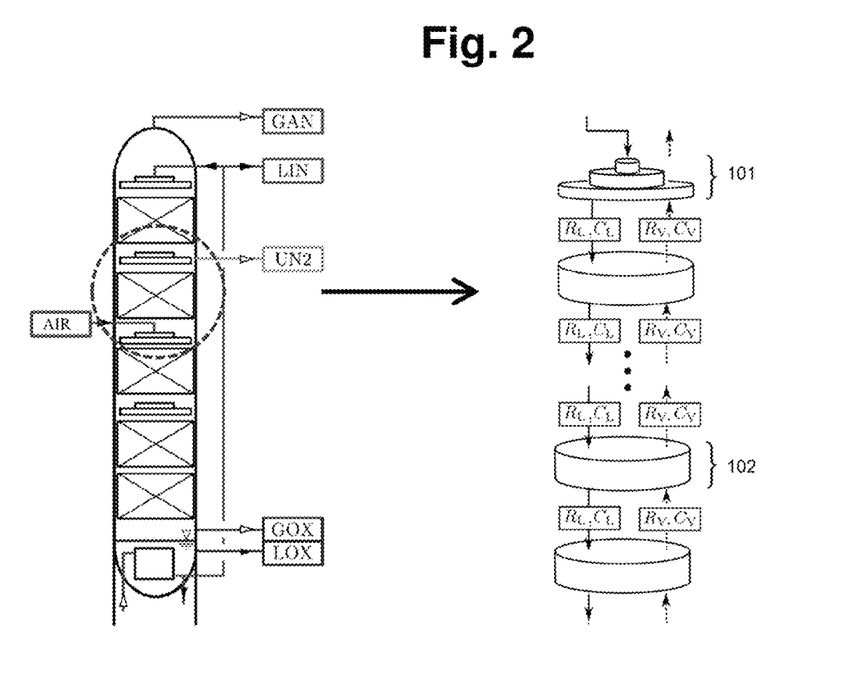
FIG. 2 schematically shows a transformation of a distillation column with multiple stages into a model with corresponding equilibrium stages.

FIG. 2 schematically illustrates a construction of a distillation column, for example on which the invention is based, with multiple stages, such as for example the low-pressure column 12 from FIG. 1, and a transformation into a model with corresponding equilibrium stages. Conventional stages of a distillation column have a distributor, one or more stages, formed here as packings (or alternatively as trays), and a collector. The distributor receives liquid coming from above and supplies this to the (uppermost) packing such that it is distributed over the area. Conversely, gas flows upwards from the packing via the distributor. Liquid exiting from the (lowermost) packing is collected in the collector and conducted downwards. Conversely, the gas coming from below is received by the collector and conducted into the packing situated above.

Overall, air (AIR) is supplied to the column, and at least oxygen and nitrogen, in each case in gaseous (GOX, GAN) and/or liquid (LOX, LIN) form, are removed from the column. Furthermore, it is normally the case that impure nitrogen (UN2) is drawn off and, if desired, noble gases such as argon, etc.

According to a preferred embodiment of the invention, in the transformation of such a distillation column into a model, use is made of models 101 for distributors and models 102 for equilibrium stages, which correspond to a packing. Here, it is also possible for a collector model to be integrated into the existing distributor model by adapting the hydrodynamics. The crossover between two stages or between one stage and a distributor is in this case subjected to flow resistances $R_L$ (liquid) and $R_V$ (gas) and also conductance values $C_L$ (liquid) and $C_V$ (gas).

It should be pointed out that, as an index, use is made of L for the liquid phase, V for the gas phase, n for the respective stage and j for the respective air component.

Use is made according to the column system of a model for an equilibrium stage (see FIG. 3) and, in a preferred refinement, also for a distributor and collector system, a condenser and a bottom (heated/unheated). A hierarchical modelling approach allows these partial models to then be combined to form the desired overall system. The calculation of the thermal substance separation is realized via equilibrium stages which are connected one behind the other and which represent a specific height of a packing.

The actual height of a packing which corresponds to precisely one equilibrium stage is also referred to as the HETP (Height Equivalent of a Theoretical Plate) value.

Substance, thermal and mechanical equilibrium of the gas and liquid streams occurring in the stage are assumed. For the purpose of modelling the flow processes, unsteady conservation of mass and energy is used. Preferably, conservation of momentum is modelled in a quasi-steady manner. Overall, there are thus preferably storage terms for mass and energy but not for the momentum. Pulse waves, that is to say sound waves, are relevant on a relatively small time scale and only in exceptional cases (for example, with the estimation of a stagnation pressure).

Figure 3:
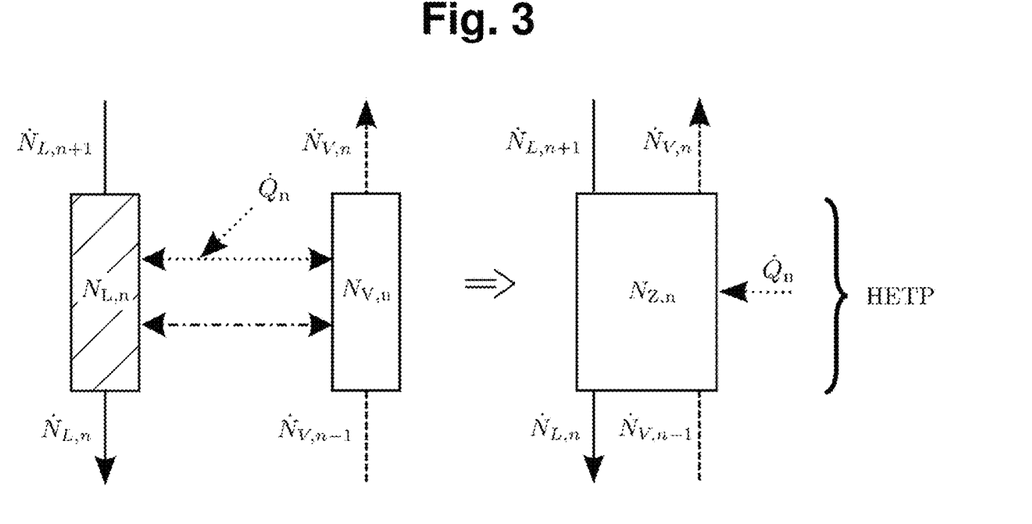
FIG. 3 schematically shows the model of a single equilibrium stage (left: separated balance space; right: combined balance volume)

The model on which each one of the equilibrium stages 102 is based is shown on the right in FIG. 3. On the left, conventional modelling with separated balance volumes for a gas phase (NV,n) and a liquid phase (NL,n) and, on the right, the applied approach with a balance volume NZ,n. $\dot{N}$ describes the molar flow across the system boundary. FIG. 3 shows how a vapor stream which rises and a liquid stream which trickles down exchange mass and energy. Here, the corresponding quantities result from the assumption of the equilibrium (rather than of a mass- and heat-transfer model).

The change in the total substance quantity $N_{Z,n}$ with respect to time corresponds to the sum of the inflowing and outflowing fractions according to:

$$\frac{d}{dt}N_{Z,n} = \dot{N}_{V,n-1} + \dot{N}_{L,n+1} - \dot{N}_{V,n} - \dot{N}_{L,n}$$

From the conservation of energy, it follows that a change in energy is composed of a heat flow, a technical working flow and an inflowing and outflowing mass flow:

$$\frac{dE}{dt} = \frac{dQ}{dt} + \frac{dL_t}{dt} + \sum_{in}\frac{d}{dt}(\dot{N}_{in} \cdot M_{W,in}) \cdot \left(h_{in} + \frac{v_{in}^2}{2} + g \cdot z_{in}\right) -$$

$$- \sum_{out}\frac{d}{dt}(\dot{N}_{out} \cdot M_{W,out}) \cdot \left(h_{out} + \frac{v_{out}^2}{2} + g \cdot z_{out}\right)$$

with
E: energy
Q: heat
$L_t$: technical work
in, out: inflowing and outflowing fractions
N: molar flow
$M_W$: molar weight
v: speed
h: partial molar enthalpy
g: acceleration due to gravity
z: height Here, the kinetic contributions $v^2/2$ can normally be neglected.

From the conservation of momentum, it follows that:

$$\frac{d\underline{P}}{dt} = \frac{d}{dt}\int_V \rho \underline{u} dV = \sum_i \underline{F}_i$$

with
$\underline{P}$: total momentum
$\rho\underline{u}$: momentum density
$\underline{F}_i$: active force (for example gravitational force)
i: running index Here, the equilibrium state contains in particular for each stage n a thermal equilibrium between gas and liquid, $T_{n,L}=T_{n,V}$, that is to say both phases have the same temperature, a substance equilibrium, $f''_{n,j}=f'_{n,j}$, that is to say the fugacity of a component j is the same in all the phases present (f' liquid and f" gaseous), and a mechanical equilibrium, $C \cdot \Delta p = R \cdot \dot{N}$, that is to say the pressure difference for a phase between two adjacent stages corresponds to the product of flow resistance and substance quantity flow. Here, for each stage, the boundary condition that the sum of the volumes of the gas $V_{n,V}$ and the liquid $V_{n,L}$ are equal to the volume of the stage $V_n$, $V_{n,L}+V_{n,V}=V_n$, is to be adhered to.

On the basis of the current fluid load, a specific pressure loss and liquid content in the system are obtained, which are determined via design correlations, as described for example by Kooijman, H. A., K. R. Krishnamurty and M. W. Biddulph: *A NEW PRESSURE DROP MODEL FOR STRUCTURED PACKING: 634th Event of the European Federation of Chemical Engineering*. GVC—VDI-Society of Chemical and Process Engineering, Germany, 2002. These advantageously also take into consideration the stagnation of liquid at the joints of the packing layers in the case of relatively large column loads. In addition, the gaseous fluid content included in the balance results therefrom via the difference between the column and liquid volumes. It is possible via a distributor and collector system to realize inward and outward feeding of the rectification system and to improve the transverse mixing of a packing column over the total cross section (diameters of up to 5 m in large-scale installations). The model according to the invention makes it possible to simulate in closed form running-dry and overflowing of the distributor.

Liquid content, and thus thermal inertia, is present in accumulated form in each distributor and collector system, which is installed above and below a packing section. These fittings are necessary for collecting and mixing the outflowing liquid, and for uniformly distributing said liquid to the packing section situated below again. Here, it is also possible for the collector model to be integrated into the existing distributor model by adapting the hydrodynamics, that is to say the collector and distributor between two stages are preferably modelled in combination.

Figure 4:
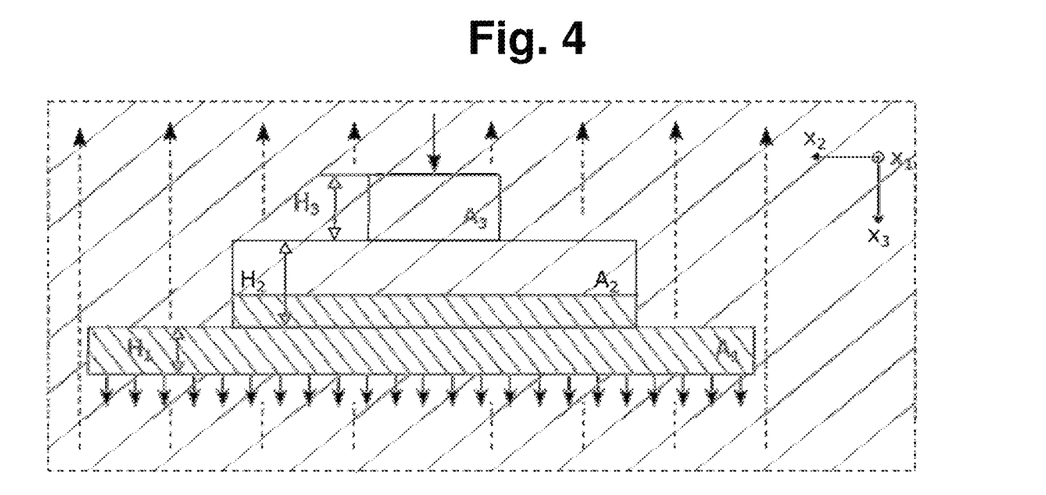
FIG. 4 schematically shows a distributor in a column section.

A distributor may be interpreted as a vessel which has different cross-sectional areas in which liquid can stagnate, as shown in a sectional view in FIG. 4. The entire column section is defined by the outer dashed line. The liquid runs, as identified by the solid arrows, from above through the cross-sectional areas $A_3$ to $A_1$, and the gas flows in the opposite direction, as identified by the dashed arrows, upwards.

The uppermost cross section $A_3$ corresponds to the inlet channel from the collector situated above or from an infeed connecting piece from the column wall. This opens out into a larger cross section $A_2$, which distributes the liquid over the column area for the first time. In said cross section, the liquid has a free surface during normal operation and the fill level varies according to the liquid load. Further channels, which assume the cross-sectional area $A_1$, are situated below said section.

Provided on the underside of these surfaces are relatively small bores, which ensure a defined delivery of the liquid onto the packing situated below. Said bores form a constriction for the liquid flow. The gas phase flowing in the opposite direction is narrowed by the cross-sectional area $A_1$ in order then to enter the packing layer situated above again over the entire column cross section, and for this reason a pressure loss occurs.

The liquid level (in $A_1$ and $A_2$) has narrow, oblique hatching, the volume filled by gas (rest) has wide, oblique hatching.

In principle, the modelling of the distributor is realized in a manner similar to the model approach for the equilibrium stage, and for this reason only the differences are discussed below. A constant value which is matched to empirical values or measurement data is assumed for the coefficient of resistance of the gas phase. This simplification is made owing to the small pressure loss of the slowly flowing gas phase and a constant channel geometry. As a reference value, the coefficient of resistance may be set to be approximately equal to that of an equilibrium stage. No mass transport takes place in a distributor between the gas and liquid phases since the specific phase interface is, in comparison with a theoretical equilibrium stage, smaller approximately by a factor of 1500. Consequently, balancing for the conservation of mass and energy is not possible over the entire content of the entire column section, but is realized separately for the two phases.

The concentration of the outflowing gas and liquid stream is thus always equal to the concentration of the corresponding fluid content. Unlike the equilibrium stage, the changed selection of the balancing gives rise to the following situation:

During a starting process from the warm, dry state, there is no liquid volume $N_L$ of the distributor model. An implicit determination of pressure via balancing of fluid-content and vessel volumes cannot therefore be realized for the liquid phase. Furthermore, this would be associated with very large gradients due to the incompressibility of liquids. Thus, for the liquid balance element, a switch is made from an isochoric consideration to an isobaric consideration. The pressure of the liquid is set to be equal to the pressure of the gas phase which is present around the distributor.

With a rising liquid quantity, the liquid volume displaces a part of the gas cushion and assumes a constantly increasing volume fraction. Due to the varying balance size of the liquid element, it is additionally necessary for technical work, in the form of volume-changing work, to be performed, which is calculated according to Stephan et al.: Thermodynamik [Thermodynamics]. Springer Berlin Heidelberg, Berlin, Heidelberg, 2013. via $$dLt = -p \cdot dV.$$

Said work is performed according to the volume change by one balance element and simultaneously absorbed by the other element, since both elements have the same pressure. The change in the liquid volume is dependent on the current fill level in the distributor, and it holds that $$dV = A(H) \cdot dH = \sum_i A_i \cdot \min(\max((H - H_i), 0), (H_{i+1} - H_i))$$

where $A_i = [A_1, A_2, A_3]$ and $H_i = [0, H_1, H_2, H_3]$ for the distributor geometry present.

For the liquid flow, the stagnation in the vessel gives rise to a different relationship for the hydrodynamics. Neglecting frictional forces, the result for the liquid phase in the $x_3$ direction from FIG. 4 is:

$$\rho L \cdot \left( u_3 \cdot \frac{\partial u_3}{\partial x_3} \right) = -\frac{\partial p}{\partial x_3} + \rho_L \cdot g$$

The friction at the phase interface is not taken into consideration since no oppositely directed streams of the gas and liquid phases occur and these are separated by the metal wall of the distributor. Likewise, the internal fluid friction can be neglected owing to the stagnation of the liquid and the reduced mean speed.

If the above equation is integrated in the $x_3$ direction from the static surface of the height H to the outflow cross section on the underside, then the result is $$\frac{\rho L}{2} \cdot u_3^2 = \Delta p_V + \rho_L \cdot g \cdot H$$

For the flow speed in the outflowing cross section $A_{Hole}$, it follows from this that:

$$u_3 = \sqrt{\frac{2 \cdot \Delta p_V}{\rho_L} + 2 \cdot g \cdot H} \quad \text{with } \Delta p_V < 0$$

This formulation is equivalent to the outflow formula of Toricelli with superimposed pressure difference $\Delta pV$ due to the rising gas flow.

For the quantity flowing away out of the distributor it follows that $$\dot{N}_L = \frac{\dot{M}_L}{M_{W,L}} = \frac{\rho_L \cdot u_3 \cdot A_{Hole}}{M_{W,L}} = \frac{\rho_L \cdot \sqrt{2 \cdot g \cdot H + \frac{2 \cdot \Delta p_V}{\rho_L}} \cdot A_{Hole}}{M_{W,L}}$$

By way of the approach for the pressure-driven flow, the coefficient of resistance of the liquid is obtained via:

$$R_L \cdot \dot{N}_L = C_L \cdot (\Delta p_V + \rho_L \cdot g \cdot H)$$

At this point, the pressure is increased by the hydrostatic pressure of the stagnated liquid.

The liquid reflux required for substance separation is provided via a condenser at the top of the column by removing heat. Situated in the bottom of the system is stagnated liquid, which can be evaporated by heat supply and thus generates a rising gas stream. Modelling for the condenser and bottom are known in the prior art.

Due to incentives for the energy markets, it is also desirable to consider a complete shutdown of the rectification system. A problem for this scenario is the use, for a dynamic starting process, of design correlations determined in a steady manner. In the case of a warm starting or cold restarting process, which is schematically illustrated in FIG. 4, initially a purely gaseous flow flows through the rectification system. In this case, a change in concentration over the column height still does not occur. (The concentration profile is established analogously to the temperature profile during two-phase operation. The column is warm at the bottom and cold at the top, and, for the concentration profile, the low boiler (lowest boiling point) builds up at the top and the high boiler builds up in the bottom.) If liquid is formed in an equilibrium stage, then this accumulates first before it flows away into the stage situated below and a steady operation is then established.

In order to simulate this process and thus a load-dependent outflow of liquid, the force equilibrium at a fluid film is considered. According to the condition $$|F_G|=|F_R|+|F_D|,$$

a criterion for the breakthrough of liquid into the equilibrium stage situated below is determined. $F_G$ represents the weight force of the liquid molecules, which acts counter to the flow direction of the gas. The shear force, transmitted by the gas, onto the film is denoted by $F_R$. Due to the pressure drop of the gas flow as a result of friction, a pressure force $F_D$ is additionally active.

In order to be able to represent the operating range of a single-phase gas flow to two-phase rectification by way of a model, conditional equations are also advantageously matched. Thus, for example, the composition of the exiting gas stream from an equilibrium stage for the single-phase situation is equal to the concentration of the fluid content in the balance element. If, when biphasicity occurs, rectification takes effect, then the low boiler builds up in the gas phase and substance separation on the basis of the isofugacity condition applies.

In order to improve the numerical behavior of the integrator at these switching points, all the discontinuities in the model are preferably regularized. For the purpose of illustration, reference is made to FIG. 5, where a function profile f(x) having a bend point at x' is shown by a solid line. f(x) could describe for example the dependence of the density on the enthalpy. In the superheated (gaseous) state, this is continuously differentiable, but has a bend at the boiling point where the first liquid molecules form since the vapor fraction depends on the enthalpy in a discontinuous manner The result of regularization is sketched using circles. As a result of the smoothed function profile, no bends occur, and the Jacobian matrix does not need to be formed anew at a switching point x'. For the next time step, the prediction is closer to the sought solution with a change of equations.

Figure 5:
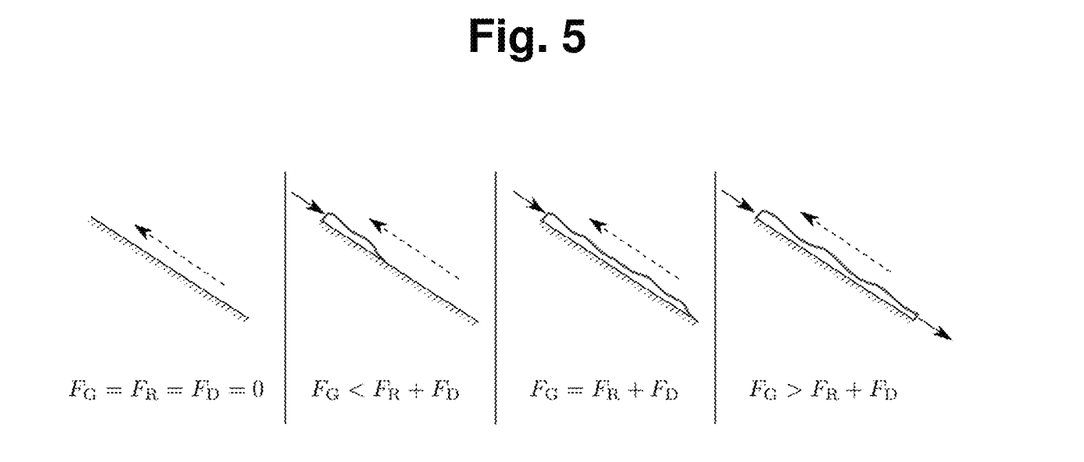
FIG. 5 shows the four possible flow states in a stage:
left: pure gas flow,
near left: accumulation of liquid,
near right: breakthrough of liquid,
right: steady flow.
Figure 6:
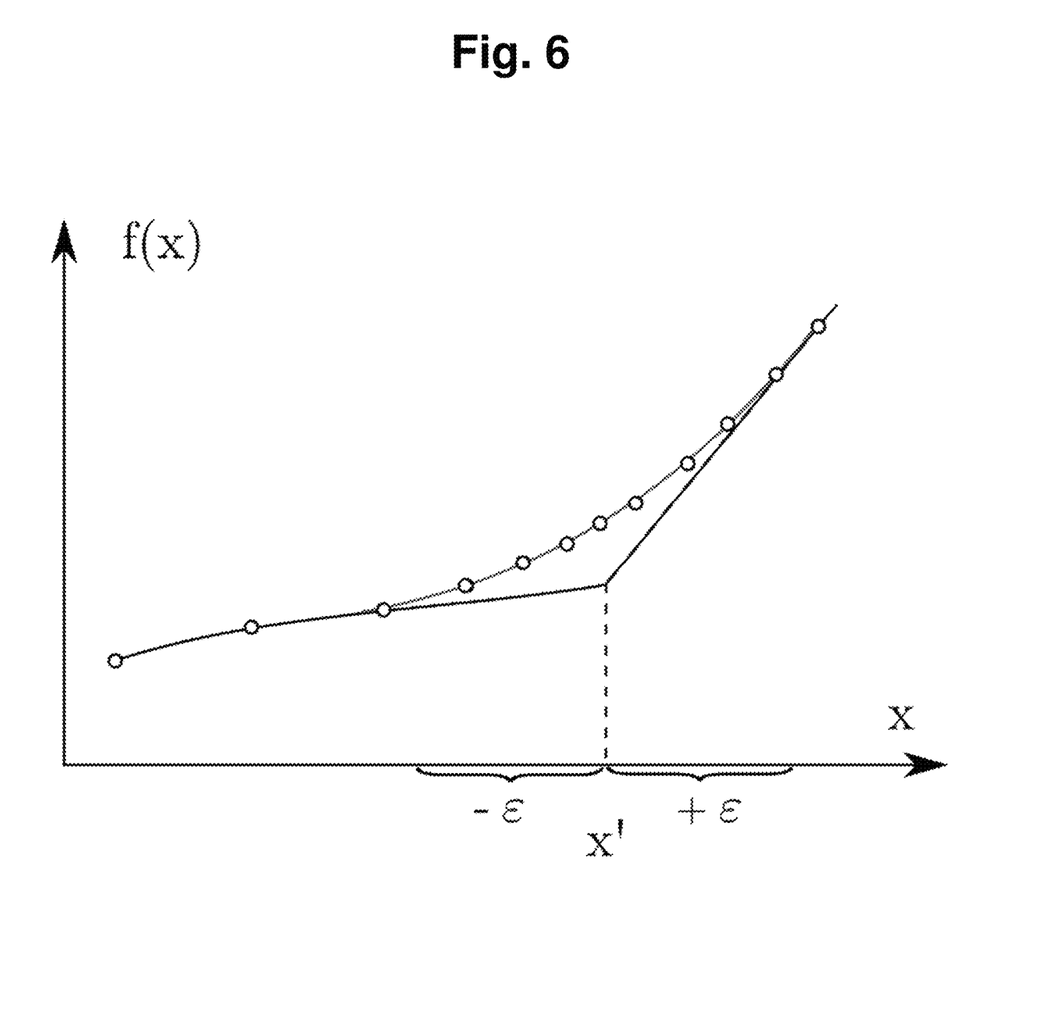
FIG. 6 illustrates regularization on the basis of the behaviour of a backward difference method.

The adapted function profile is determined for example via a homotopy parameter $\lambda$ according to $$f(x)=(1-\lambda)\cdot f(x)_{x<x'}+\lambda \cdot f(x)_{x>x'},$$

which transforms the model equations into one another. The range with deviations from the original function profile is referred to as a regularization interval and is indicated in FIG. 5 by $\varepsilon$.

For example, it is possible according to a preferred embodiment for a quarter of a sine wave to be used for the determination of the homotopy parameter, and it holds that:

$$\lambda = \begin{cases} 0 & \text{for } x \leq -\varepsilon \\ 0.5+0.5\cdot\sin\left(\frac{\pi}{2}\cdot\frac{x}{\varepsilon}\right) & \text{for } -\varepsilon < x < \varepsilon \\ 1 & \text{for } x \geq \varepsilon \end{cases}$$

This model approach allows a simplified initialization strategy to be applied with time as a homotopy parameter. The stabilization of the model for zero flows and the possible change of the aggregate state allows the system to be initialized with a stationary gas cushion. The onset of the fluid movement and the occurring substance separation are established according to the conditions of the infeed streams. This is especially advantageous for determining a steady solution of a coupled double-column system since no concentration profiles have to be estimated beforehand.

In principle, for the purpose of stabilizing the column model and the representability of single-phase and two-phase flow forms, several adaptations of the basic model are expedient.

For each switch of the calculation equations, use is advantageously made of a regularization function which allows a continuously differentiable crossover. For this concept, it is advantageous to define a generally valid switching variable with which the blend functions are activated. For the present simulation task, the concept of the generalized vapor fraction has proven to be particularly robust, which is explained according to Thomas below: For the vapor fraction of a flow vector, it generally holds that $$vf = \frac{h-h'}{h''-h'}$$

with the simplified notation of h' for the condition "boiling point" and h" for the "dew point". In process engineering, it is normally the case that a stream which is completely liquid is characterized by the vapor fraction vf=0, while of =vf=1 holds for a single-phase gaseous substance. The precise state in the two-phase region is defined analogously via a vapor fraction 0<vf <1. For numerical reasons, it is also expedient for use to be made outside the two-phase region of an umambiguous definition of the state of the flow vector, which is continuously differentiable. For this purpose, the vapor fraction can be extrapolated beyond the phase change points, and, for the entire solution space, the following definition holds:

$$vf_{gen} = \frac{h(z,p,T)-h'(x^*,p,T')}{h''(y^*,p,T'')-h'(x^*,p,T')}$$

By this formulation, $vf_{gen}$ assumes values greater than 1 for a superheated, gaseous stream and less than 0 for a single-phase, undercooled stream. Consequently, an imminent phase change can already be detected before the actual occurrence and, if appropriate, measures for the stabilization of the model can be enabled before the actual switching point.

Use is made of regularization functions for the continuously differentiable blend of model equations of different operating states. All the functions with which the parameter $\lambda$ can be varied between zero and one are referred to as regularization functions. The result of this is that a function profile according to $f(x)=(1-\lambda)\cdot f(x)_{x<x'}+\lambda\cdot f(x)_{x>x'}$ can be defined in sections and is interblended in a specific region. The simplest function with which the parameter $\lambda$ can be determined is a line equation.

For the equilibrium stage and the distributor system, it is preferably possible to use the following regularizations.

For the equilibrium stage, these are:

phase separation for the gas phase

The phase separation on the basis of the isofugacity condition is always calculated independently of the current state of the entire content in the balance element. Also, in the superheated state, virtual compositions are determined from extrapolated fugacity coefficients, which have no physical meaning. Consequently, it is necessary to blend the composition of the outflowing gas phase in the single-phase case from the equilibrium concentrations to the concentration of the volume phase.

stabilization of the properties of the liquid phase

For the determination of the composition of the liquid flowing away from an equilibrium stage, it is likewise necessary to make a case distinction between a dry and active packing. Owing to large gradients, with a blend of the discontinuous profile of the substance data from the gas phase to the liquid phase, smoothing at this point is not effective.

stabilization of the design correlations

In order to eliminate problems during the calculation of gradients for a zero flow, at this point, the transfer of the current load parameters for the calculation of the design correlations is limited. Consequently, it is possible to replace the selected design correlation for packings by any desired other correlation without having to adapt the model equations.

The distributor model described above must be calculable both for dry operation and for operation with a liquid level. In comparison with the equilibrium stage, the gas and liquid phases are balanced separately. Consequently, the liquid content disappears for the single-phase case, and the fill level H in the distributor is equal to zero. The adapted outflow relationship according to Toricelli is, with the slope of the root function for H→0, a problem from a numerical viewpoint. The infinite slope for the function value zero leads to a singularity in the Jacobian matrix and the gradient-based solver fails. Squaring $u_3$ and replacing the square of the liquid speed via $$u_3^2 = u_3 \cdot (|u_3| + B_1 \cdot e^{-B_2 \cdot u_3})$$

can remedy this. By the choice of the parameter $B_1$, the slope $du/dh|h=0$ is determined such that the solution method converges. The deviation from the original function profile can be set via the selection of the parameter $B_2$. The larger this value is, the smaller the absolute deviation.

The invention claimed is:

1. A method for operating a distillation column (12) having multiple column stages for separating a feed fluid stream into individual fluid components, comprising:

determining a state of the distillation column from a plurality of states by means of a model in a manner dependent on pressure differences prevailing between each two adjacent column stages of said multiple column stages, wherein the plurality of states represent a complete operating range of the distillation column, wherein, in the model, both gaseous flows and liquid flows between the each two adjacent column stages are determined by the pressure differences prevailing between the each two adjacent column stages, wherein, in the model, a substance quantity flow $\dot{N}_V$ which characterizes the gaseous flow between the each two adjacent column stages of said multiple column stages is given by $\dot{N}_V \cdot R_V = C_V \cdot \Delta p_V$, and a substance quantity flow $\dot{N}_L$ which characterizes the liquid flow between the each two adjacent column stages is given by $\dot{N}_L \cdot R_L = C_L \cdot \Delta p_L$, wherein, $\Delta p_V$ is a total gaseous pressure difference between the each two adjacent column stages, $\Delta p_L$ is a total liquid pressure difference between the each two adjacent column stages, $R_V$ is a gaseous coefficient of resistance between the each two adjacent column stages, $R_L$ is a liquid coefficient of resistance between the two each adjacent column stages, $C_V$ is a gaseous conductance value of the gaseous flow between the two each adjacent column stages, and $C_L$ is a liquid conductance value of the liquid flow between the two each adjacent column stages, on the basis of the determined state, for at least one manipulated variable influencing the state, setting a manipulated variable value influencing the state, in a manner dependent on at least one control variable, wherein the at least one control variable comprises a product quality, a product volume flow, a product mass flow or a cost variable, and operating the distillation column (12) using the determined state of the distillation column (12) using the at least one control variable.

2. The method according to claim 1, further comprising determining the state during a disappearance or appearance of the gaseous flow or the liquid flow between the each two adjacent column stages.

3. The method according to claim 2, further comprising using a regularization function to determine the state.

4. The method according to claim 2, wherein the disappearance or appearance of said gaseous flow or said liquid flow between the each two adjacent column stages comprises a change from a fluid movement to a zero flow, a change from a zero flow to a fluid movement, a change from a single-phase gas flow to a two-phase rectification or a change from a two-phase rectification to a single-phase gas flow.

5. The method according to claim 1, wherein, in the model, the state is characterized by a temperature and/or fluid component concentrations for each column stage of the each two adjacent column stages.

6. The method according to claim 1, further comprising modelling a column stage of said multiple column stages as an equilibrium stage, wherein a substance, thermal, and mechanical equilibrium of the individual fluid components flowing in the column stage and flowing away from the column stage is assumed by the model.

7. The method according to claim 1, further comprising applying a backward difference method with a predictor-corrector method for determining a change in the state with respect to time.

8. A computing unit which is set up to carry out the method according to claim 1.

9. A computer program which causes a computing unit to carry out the method according to claim 1 when said program is executed on the computing unit.

10. A machine-readable storage medium having the computer program according to claim 9 stored thereon.

11. An air separation installation, having the computing unit according to claim 8.

* * * * *